United States Patent
Stojkovic et al.

(10) Patent No.: US 9,388,843 B2
(45) Date of Patent: Jul. 12, 2016

(54) FASTENER RECEPTACLE AND VEHICLE PART

(71) Applicant: FORD GLOBAL TECHNOLOGIES, LLC, Dearborn, MI (US)

(72) Inventors: Dragan B. Stojkovic, Taylor, MI (US); Matthew Forsyth, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 112 days.

(21) Appl. No.: 14/310,425

(22) Filed: Jun. 20, 2014

(65) Prior Publication Data

US 2015/0369274 A1    Dec. 24, 2015

(51) Int. Cl.
  *F16B 37/06* (2006.01)
  *B23P 19/04* (2006.01)

(52) U.S. Cl.
  CPC ............... *F16B 37/067* (2013.01); *B23P 19/04* (2013.01); *Y10T 29/49957* (2015.01)

(58) Field of Classification Search
  CPC ... F16B 37/067; F16B 37/065; F16B 19/1045
  USPC ............................................. 411/34, 181, 183
  See application file for complete search history.

(56) References Cited

U.S. PATENT DOCUMENTS

| | | | | |
|---|---|---|---|---|
| 3,215,026 A | * | 11/1965 | Davis | F16B 37/067 411/34 |
| 3,404,596 A | * | 10/1968 | Ryder | F16B 13/061 411/36 |
| 3,667,340 A | * | 6/1972 | Black | F16B 19/008 411/38 |
| 3,750,525 A | * | 8/1973 | Waters | F16B 19/008 411/181 |
| 3,837,208 A | | 9/1974 | Davis et al. | |
| 4,044,591 A | * | 8/1977 | Powderley | B21J 15/045 411/34 |
| 4,696,610 A | | 9/1987 | Wright | |
| 5,025,128 A | | 6/1991 | Derbyshire | |
| 6,494,652 B1 | | 12/2002 | Summerlin | |
| 2014/0271024 A1 | * | 9/2014 | Jones | F16B 19/1054 411/43 |

FOREIGN PATENT DOCUMENTS

| | | | |
|---|---|---|---|
| EP | 0595041 A2 | 5/1994 | |
| EP | 0945631 A2 | 9/1999 | |

* cited by examiner

*Primary Examiner* — Flemming Saether
(74) *Attorney, Agent, or Firm* — Jason C. Rogers; Brooks Kushman P.C.

(57) ABSTRACT

A rivet-nut for a vehicle component includes a tubular barrel and a head attached to the barrel. The barrel includes a sidewall having a threaded section with the first wall thickness and a crush section with the second wall thickness that is less than the first sidewall thickness. The head is attached to one end of the crush section and includes a channel recessed into a part engaging surface of the head around a perimeter of the barrel. The rivet-nut may be installed onto a part. When installed the rivet-nut includes a compressed annular locking ring that engages the part opposite the head to clinch the rivet-nut to the part.

19 Claims, 4 Drawing Sheets

FASTENER RECEPTACLE AND VEHICLE PART

TECHNICAL FIELD

The present disclosure relates to fastener receptacles for thin-walled automotive vehicle parts.

BACKGROUND

The current regulatory and economic environment has increased the importance of motor vehicle fuel efficiency and functionality. One way to reduce the fuel consumption of a vehicle is to reduce vehicle weight. Aluminum alloys typically have a higher strength to weight ratio than steel alloys. Replacing steel with aluminum offers the potential for weight reduction. Aluminum alloy parts may have relatively thin sidewalls having a thickness of 1.0 millimeter or less.

Automotive vehicles include parts that are only accessible from one side. One sided access limits fastener options as traditional nuts and bolts are impractical. Prior solutions include machining a tapped hole in the sidewall of the part or welding a nut onto the part. The thin sidewalls reduce the ability to use tapped holes as a one-sided fastening option. Aluminum alloys are also more difficult and expensive to weld then corresponding steel parts, which makes welding nuts to aluminum parts impractical.

Blind rivets may be used to attach adjacent parts with only one sided access. However, in certain applications it is advantageous to provide a threaded connection on a part having only one sided access. Rivet-nuts are one solution for providing a threaded connection in parts with one-sided access. Traditional rivet-nuts may fail to achieve a sufficiently strong joint on parts having a sidewall thickness of 1.0 millimeter (mm) or less. Aluminum alloy parts may be specified that have sidewall thicknesses of less than 1 mm. There is a need for one-sided fastener receptacles suitable for thin wall parts has increased with the increased use of aluminum alloy parts on vehicles.

The above challenges and other challenges are addressed by this disclosure as summarized below.

SUMMARY

According to an aspect of the present disclosure, a rivet nut for a vehicle component includes a tubular barrel and a head attached to the barrel. The barrel includes a sidewall having a threaded section with the first wall thickness and a crush section with the second wall thickness that is less than the first sidewall thickness. The head is attached to one end of the crush section and includes a channel recessed into a part engaging surface of the head around a perimeter of the barrel.

According to another aspect of the present disclosure, a vehicle part assembly includes a part wall defining a hole in a recessed area and a fastener receptacle received within the hole. The fastener receptacle includes a tubular barrel attached to a head. The head has a channel recessed into the head around a perimeter of the barrel. The barrel is received through the hole and an edge of the recessed area is received within the channel. The includes a compressed annular locking ring that engages the part opposite the head.

According to yet another aspect of the present disclosure, a method of assembling a fastener receptacle in a vehicle part is disclosed. The vehicle part includes a wall having a hole, an inside surface and an outside surface. The fastener receptacle includes a hollow barrel and a head attached to one end of the barrel. The head includes a channel recessed into the head around a perimeter of the barrel. The method comprises inserting the barrel of the fastener into the hole with the channel facing the outside surface. Then collapsing the barrel axially to integrally form a compressed annular locking ring engaged with the inside surface. The collapsing barrel draws an edge of the hole into the channel to clinch the fastener receptacle to the part.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
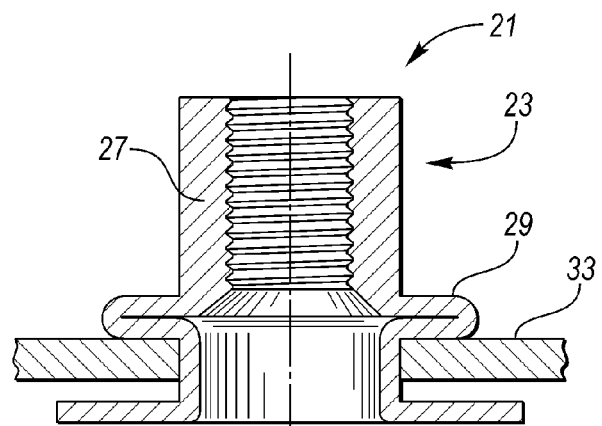
FIG. 1 is a perspective view of a prior art rivet-nut prior to installation on a part.

FIG. 1 illustrates a prior art rivet-nut 21 having a barrel 23 that is connected to a head 25. The barrel 23 includes a threaded portion 27 and a deformable portion that is crushed to form a locking ring 29. The locking ring 29 and the head 25 cooperate to clinch the work piece 33 and secure the rivet-nut in place.

Figure 2:
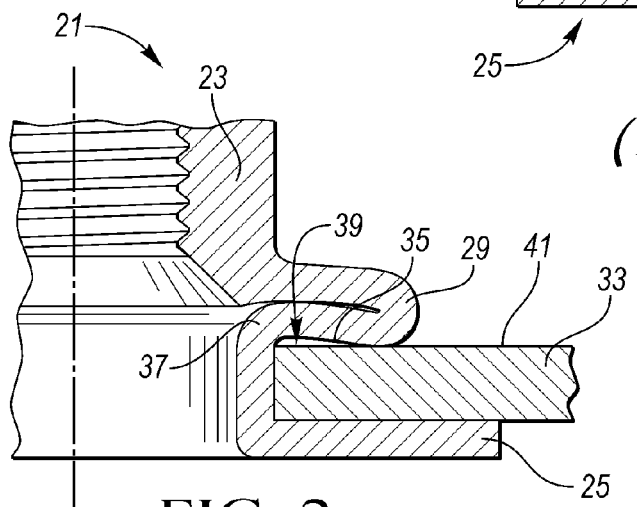
FIG. 2 is a magnified side view of the rivet-nut of FIG. 1 installed on a part and shows the potential gapping problem associated with the prior art rivet nut.

FIG. 2 illustrates one problem associated with traditional rivet-nuts. The head 25 prevents the work piece 33 from bending and thus the work piece 33 is perpendicular to the barrel 23. Ideally, the locking ring 29 would engage with the work piece 33 along the entire bottom surface 35 of the locking ring 29. This requires a 90° bend of the barrel wall and an extremely small radius at bend 37. In reality, a 90° bend is unachievable.

Instead, the radius at bend 37 is larger causing the locking ring 29 to rise above the work piece 33 and then dip down to engage the work piece 33. This creates a noncontact zone 39 proximate to the work piece inner surface 41. This noncontact zone 39 reduces the strength of the joint between the work piece 33 and the rivet-nut 21. The noncontact zone issue is exacerbated when the rivet-nut 21 is installed on a work piece 33 that is 1 mm or less in thickness.

Figure 3:
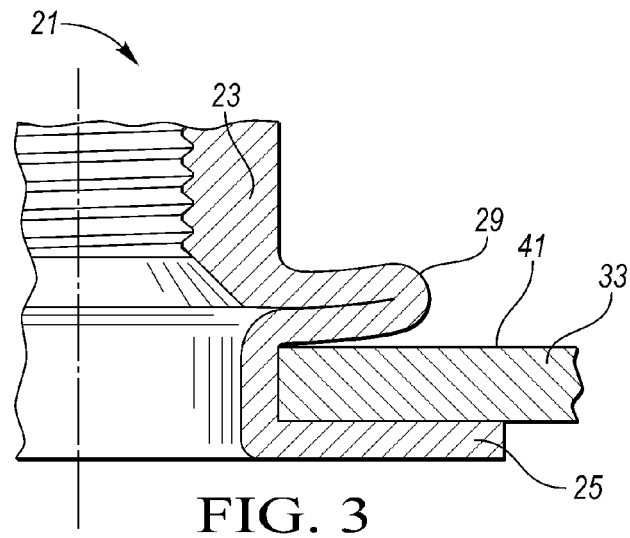
FIG. 3 is another magnified side view of the rivet-nut of FIG. 1 installed on a part and shows the potential curling problem associated with the prior art rivet-nut.

The length of the barrel can be increased to create a larger locking ring 29 in order to make up for the noncontact area. Increasing the size of the locking ring 29 can cause the locking ring 29 to curl upwardly away from the work piece 33 as is shown in FIG. 3. This curling effect causes a portion of the locking ring 29 to be disengaged with the work piece 33 and also reduces the strength of the joint. The curling issue is also exacerbated when the rivet-nut 21 is installed on a work piece 33 that is 1 mm or less in thickness.

Figure 4:
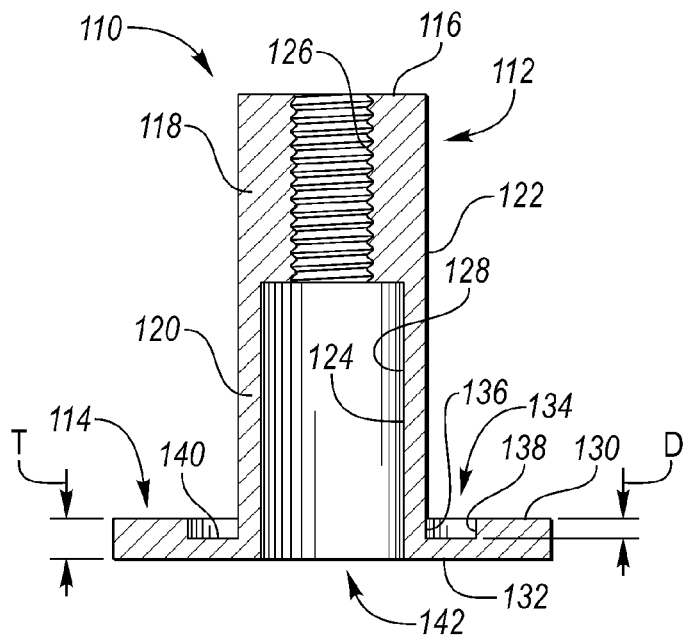
FIG. 4 is a cross-sectional view of a rivet-nut made in accordance with one embodiment of this disclosure.
Figure 5:
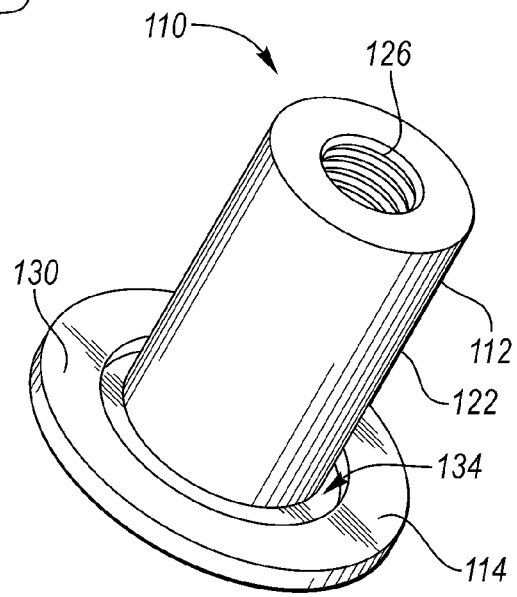
FIG. 5 is a perspective view of the rivet-nut shown in FIG. 4.

Referring to FIGS. 4 and 5, a rivet-nut 110 is illustrated that is made in accordance to one embodiment of this disclosure. The rivet-nut 110 includes a tubular barrel 112 that is connected to a head 114 at one end of the barrel 112. The barrel 112 may have a circular cross-section. The barrel 112 includes a sidewall 116 having a threaded section 118 and a crush section 120. The sidewall 116 has an outer surface 122 and an inner surface 124 that defines an inner cavity. The sidewall inner surface 124 has a threaded portion 126 extending along the threaded section 118 and a substantially smooth portion 128 extending along the crush section 120. The treaded section 118 has a first wall thickness defined between the outer surface 122 and the inner surface thread portion 126. The crush section 120 has a second wall thickness defined between the smooth inner surface 128 and the outer surface 122. The first sidewall thickness is thicker than the second sidewall thickness. The thickness of the sidewall 116 may abruptly change between the threaded section and the crush section, as is shown in FIG. 1, or may have a transition thickness between the threaded section and the crush section.

The head 114 may be a planar annular body that includes a part engaging surface 130 and an exposed surface 132 that is opposite the part engaging surface 130. The sidewall inner surface 124 extends through the head 114 and defines an opening 142 in the exposed surface 132. The head 114 includes a thickness T defined between the part engaging surface 130 and the exposed surface 132. A channel 134 is recessed into the part engaging surface 130 around a perimeter of the barrel 112. The channel 134 includes an inboard wall 136 that is defined by the barrel outer surface 122 and an outboard wall 138 opposite the inboard wall 136. The channel 134 also includes a bottom surface 140 defined between the inboard and outboard walls 136, 138. The channel 134 includes a depth D defined between the part engaging surface 130 and the bottom surface 140. The channel 134 may have a flat bottom surface and substantially vertical walls.

The head thickness T may be twice as large as the channel depth D. Alternatively, the head thickness T may be three or four times as large as the channel depth D. The specific T to D ratio may vary depending upon the specific application of the rivet-nut 110.

The rivet-nut 110 is a fastener receptacle that combines a rivet with a threaded receptacle. Rivet-nuts allow a threaded receptacle to be attached to part surfaces where nuts and tapped holes are impractical. An example application for rivet nuts is on a thin-walled part having only one sided access. The one sided access prevents a nut or other threaded body from being attached to the inner side of the part and the thin wall prevents a tapped hole from being used. The rivet-nut can be attached to the thin wall and provide a threaded sleeve for receiving a fastener. Rivet-nuts are advantageous for aluminum thin-walled parts because they do not require welding.

Figure 6:
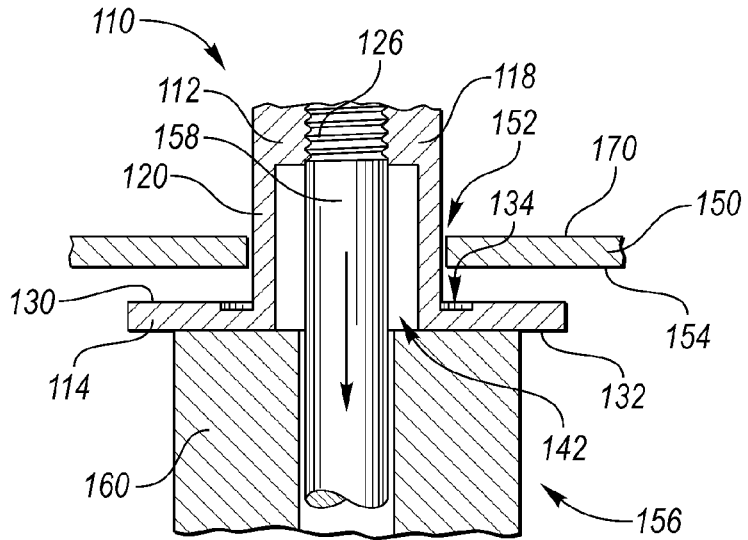
FIG. 6 is a cross-sectional view of the rivet-nut of FIGS. 4 and 5 partially installed on a part by an installation tool.
Figure 7:
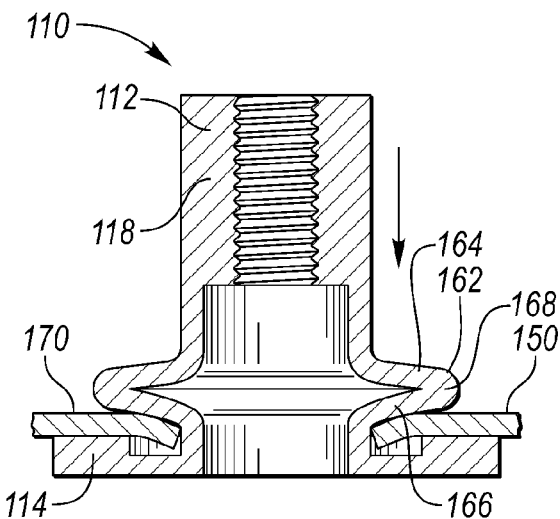
FIG. 7 is a cross-sectional view of the rivet-nut of FIGS. 4, 5 and 6 fully installed on the part.

Referring to FIGS. 6 and 7 the rivet-nut 110 is shown partially installed on a part 150. The part 150 includes an outer surface 154 and a part inner surface 170. A hole 152 is defined into the part 150 and extends between the outer surface 154 and the inner surface 170. The barrel 112 is received within the hole 152 with the part engaging surface 130 facing the outer surface 154.

An installation tool 156 is used to secure the rivet-nut 110 to the part 150. The installation tool 156 may include an engaging member 160 and a mandrel 158 that is configured to slide relative to the engaging member 160. The mandrel 158 includes threads that correspond to threads in the threaded section 118. The engaging member 160 is configured to engage the exposed surface 132 of the head 114. The mandrel 158 is inserted though the head opening 142 and is screwed into the threaded section 118. The engaging member 160 is placed against the exposed surface 132 of the head 114 to hold the rivet-nut 110 in place while the mandrel 158 is pulled out of the barrel 112. The mandrel 158 is pulled out of the barrel causing the crush section 120 to buckle. The buckled crush section integrally forms a crushed annular locking ring 162 that is axially compressed and radially expanded. The crushed annular locking ring 162 extends around the periphery of the barrel 112.

Figure 8:
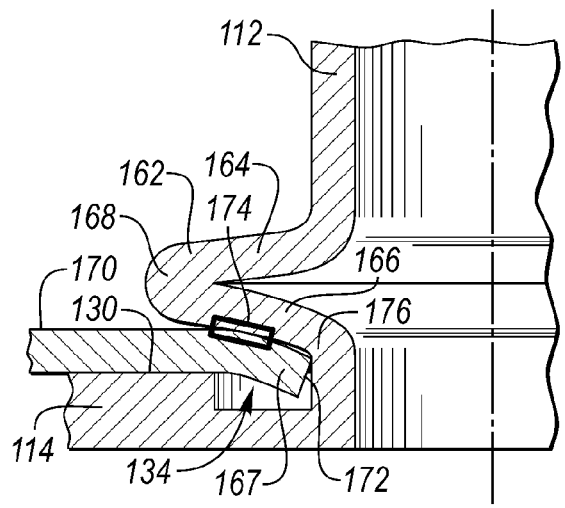
FIG. 8 is a magnified cross-sectional view of the fully installed rivet-nut of FIG. 7.

Referring to FIGS. 7 and 8 the locking ring 162 includes a first overlapping section 164 and a second overlapping section 166 that join at a bend 168. The first overlapping section 164 engages with an inner surface 170 of the part 150 along engagement area 174. During buckling of the barrel 112, compression force from the first overlapping section 164 bends the part 150 forming a recessed area 167 around a perimeter of the hole 152.

The recessed area 167 includes an edge 172 that defines the perimeter of the hole 152. The edge 172 is disposed within the channel 134. The recessed area 167 is bent to form an acute angle between the inner surface 170 of the recessed area 167 and the barrel 112. The recessed area 167 also has an inclined angle with respect to the part engaging surface 130. This is in contrast to FIGS. 1 to 3, where the edge portion of the part is perpendicular to the barrel and is parallel to the head. When the edge portion is perpendicular to the barrel, a 90 degree bend is required. As was described above, 90 degree bends are unachievable, which leads to reduced engagement between the part and the rivet-nut. The inclined angle of the embodiment shown in FIGS. 7 and 8 requires a bend that is less than 90 degrees. Having a bend that is less than 90 degrees reduces the gap between the second overlapping section 166 and the part inner surface 170 providing an increased engagement area 174 as compared to prior designs. The second overlapping section 166 also extends into the channel 134 to further reduce the degree of bending at radius 176. The larger engagement area 174 provides a stronger more robust connection between the rivet-nut 110 and the part 150 as compared prior art solutions. The inclined angle of the edge portion reduces the problem of curling.

Figure 9:
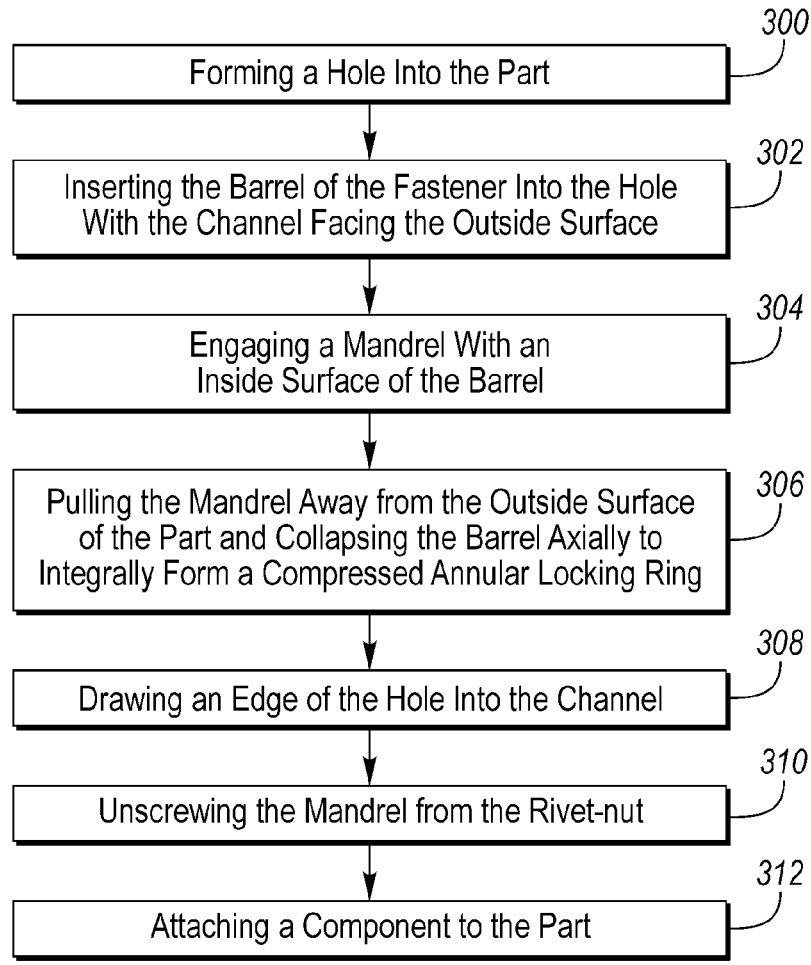
FIG. 9 is a flow chart illustrating one method for installing a rivet-nut on to a part.

FIG. 9 shows a flow chart for installing a rivet-nut on to a part with reference to FIGS. 6 to 8. A hole 152 for receiving the rivet-nut 110 is formed in to the part 150 at step 300. The barrel 112 is inserted through the hole 152 with the channel 134 facing the outer surface 154 of the part 150 at step 302. An installation tool 156 is used to secure the rivet-nut 110 to the part 150. The mandrel 158 is inserted though the head opening 142 and is screwed into the threaded section 118 at step 304. At step 306, the engaging member 160 is placed against the exposed surface 132 of the head 114 to hold the rivet-nut 110 in place as the mandrel 158 is pulled out of the barrel causing the crush section 120 to collapses axially to integrally form a compressed annular locking ring 162 that extends around the periphery of the barrel 112. At step 308, the first overlapping section 164 engages with an inner surface 170 of the part 150 along engagement area 174 to draw an edge 172 of the part 150 into the channel 134 as the barrel 112 collapses. At step 310, the mandrel 158 is unscrewed from the rivet-nut 110 after the rivet-nut has been clinched to the part 150. At step 312 a component may be attached to the part 150 by a fastener screwed into the rivet-nut 110.

Figure 10:
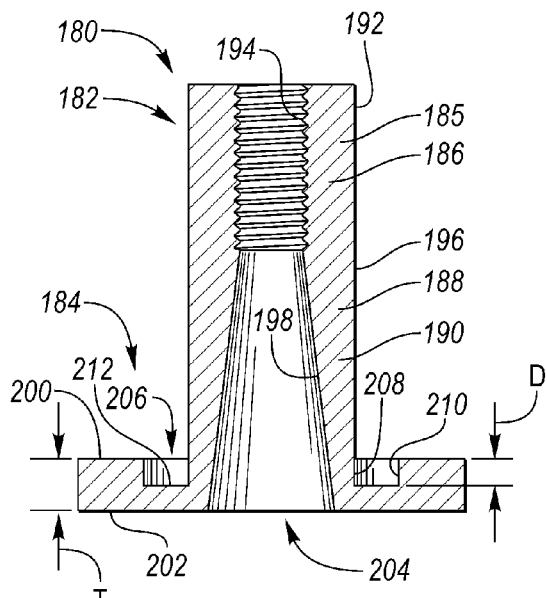
FIG. 10 illustrates a cross-sectional view of an alternative embodiment of a rivet-nut made in accordance with another embodiment of this disclosure.

Referring to FIG. 10, a rivet-nut 180 is shown. The rivet-nut 180 includes a tubular barrel 182 that is connected to a head 184 at one end of the barrel 182. The barrel 182 includes a threaded section 185 having a first sidewall portion 186 and a crush section 188 having a second sidewall portion 190. The first sidewall portion 186 may be a relatively constant thickness and includes an outer surface 192 and an inner treaded surface 94 that are substantially parallel with respect to each other.

The second sidewall 190 includes a straight outer surface 196 that may be integral with outer surface 192. The second sidewall 190 may include a tapered inner surface 198. The second sidewall is widest at the end adjoining the threaded section 185 and is thinnest proximate the head 184. For example, the second sidewall 190 thickness may tapers from 2.5 mm to 0.5 mm. The tapered inner surface 198 may taper at a constant slope (as is shown in FIG. 10) or may taper at a variable slope or may taper in steps with several different slopes. The crush section 188 can be tuned by modifying the geometry of the inner surface 198 and the thickness of the second sidewall 190.

The head 184 may be a planar annular body that includes a part engaging surface 200 and an exposed surface 202 that is opposite the part engaging surface 200. The inner surface 198 extends through the head 184 and defines an opening 204 in the exposed surface 202. The head 184 includes a thickness T defined between the part engaging surface 200 and the exposed surface 202. A channel 206 is recessed into the part engaging surface 200 around a perimeter of the barrel 182. The channel 206 includes an inboard wall 208 that is defined by the barrel outer surface 196 and an outboard wall 210 opposite the inboard wall 208. The channel 206 also includes a bottom surface 212 defined between the inboard and outboard walls 208, 210. The channel 206 includes a depth D defined between the part engaging surface 200 and the bottom surface 212. The crush section 188 can be designed to form a single compressed annular locking ring or two compressed annular locking ring when the barrel 182 is collapsed depending upon the design of the taper. The two compressed annular locking rings can be formed by a crush section having multiple sidewall thicknesses, such as a tapered thickness or multi-stepped thickness.

Figure 11:
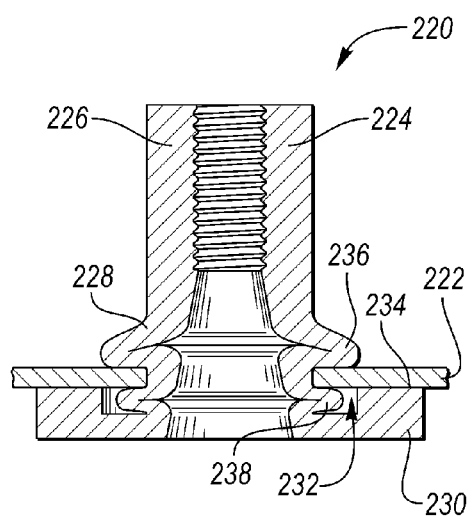
FIG. 11 is a cross-sectional view of the rivet-nut of FIG. 10 fully installed on the part.
Figure 12:
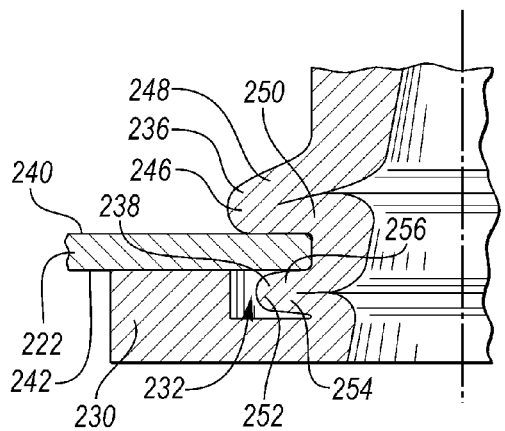
FIG. 12 is a magnified cross-sectional view of the fully installed rivet-nut of FIG. 11.

FIGS. 11 and 12 illustrate a rivet-nut 220 installed on a part 222. The rivet-nut 220 may be installed into the part 222 according the method described above. The rivet-nut 220 includes a barrel 224 having a threaded section 226 and a crush section 228. The barrel 224 is connected to a head 230 that includes a channel 232 defined into a part engaging surface 234 around a periphery of the barrel 224. The crush section 228 includes an upper compressed annular locking ring 236 and a lower compressed annular locking ring 238. The upper compressed annular locking ring 236 includes a first overlap 248 and a second overlap 250 forming a bend 246. The lower compressed annular locking ring 238 includes a first overlap 256 and a second overlap 254 forming a bend 252.

The upper and lower locking rings 236, 238 portions may be different sizes. For example, the upper locking ring 236 may extend outwardly from the barrel 224 farther than the lower locking ring 238. The upper locking ring 236 engages the inner side 240 of the part 222 and the lower locking ring is disposed in the channel 232 and engages the outer side 242 of the part 222. The upper and lower locking rings 236, 238 cooperate to clamp the part in between the locking rings and tightly engage the part outer side 242 with the part engaging surface 234.

Figure 13:
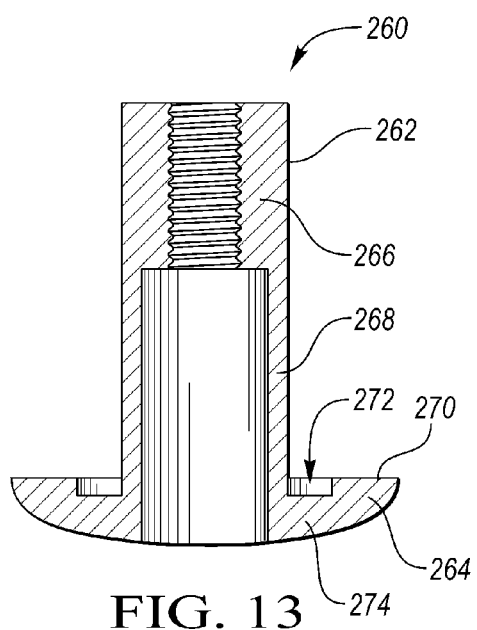
FIG. 13 is a cross-sectional view of alternative embodiment of a rivet—having a rounded head.

FIG. 13 illustrates a rivet-nut 260 having a barrel 262 and a head 264. The barrel 262 is similar to the other embodiments and includes a threaded section 266 and a crush section 268. The crush section of the barrel 262 may be deformed to clinch a part as described previously. The head 264 includes a part engaging surface 270 that defines a channel 272. The head 264 includes an exposed surface 274. The exposed surface 274 is rounded.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A rivet-nut for a vehicle component, comprising:
a barrel including a sidewall having a threaded section and a crush section that is thinner than the threaded section; and
a head attached to the barrel at an end of the crush section and including a channel recessed into a part engaging surface of the head around a perimeter of the barrel, wherein the channel has an outboard wall that is parallel to the sidewall, an inboard wall defined by an outer surface of the barrel, and a bottom surface connected between the inboard and outboard walls.

2. The rivet-nut of claim 1 wherein the head further includes an exposed surface opposite the part engaging surface and cooperating with the part engaging surface to define a head thickness (T), and wherein the channel includes a channel depth (D) defined between the part engaging surface and the bottom surface of the channel, and wherein the ratio of T to D is 2.

3. The rivet-nut of claim 1 wherein the second wall thickness tapers along an axial direction of the barrel.

4. The rivet-nut of claim 1 wherein the crush section is configured to buckle when the barrel is compressed toward the head.

5. The rivet-nut of claim 1 wherein the outboard wall is perpendicular to the bottom.

6. The rivet-nut of claim 1 wherein the crush section extends into the channel and ends at the bottom surface of the channel.

7. The rivet-nut of claim 1 wherein the barrel has a circular cross-section.

8. The vehicle part assembly of claim 1 wherein the inboard wall and the outboard wall are substantially parallel to each other.

9. A vehicle part assembly comprising:
a part wall defining a hole in a recessed area; and
a fastener receptacle including a tubular barrel attached to a head having a part engaging surface, and a channel recessed into the part engaging surface around a perimeter of the barrel, wherein the channel has a bottom surface that is substantially parallel to the part engaging surface, wherein the barrel is received through the hole and an edge of the recessed area is received within the channel, wherein the barrel includes a compressed annular locking ring that engages the part opposite the head.

10. The vehicle part assembly of claim 9 wherein the barrel further includes a proximal end attached to the head and a distal end, and wherein the barrel further includes a threaded section extending axially from the distal end along an inside portion of the barrel.

11. The vehicle part assembly of claim 9 wherein the channel further includes an inboard wall formed by an outer wall of the tubular barrel, and an outboard wall.

12. The vehicle part assembly of claim 11 wherein the head further includes a hole extending between the part engaging surface and an exposed surface.

13. The vehicle part assembly of claim 11 wherein the outboard wall is substantially parallel to the inboard wall.

14. The vehicle part assembly of claim 9 wherein the compressed annular locking ring extends outwardly beyond a perimeter of the channel.

15. The vehicle part of claim 9 wherein the compressed annular locking ring includes a first overlapping section and a second overlapping section joined at a bend, and wherein the second overlapping section engages with an inner side of the part.

16. The vehicle part of claim 9 wherein the compressed annular locking ring is a first integrally formed compressed annular locking ring and wherein the fastener further comprises a second integrally formed compressed annular locking ring.

17. The vehicle part of claim 16 wherein the first compressed annular locking ring engages an inside surface of the part and the second compressed annular locking ring is disposed within the channel and engages an outside surface of the part.

18. A vehicle assembly comprising:
a part wall defining a hole in a recessed area; and
a rivet-nut including a barrel, a head having an engaging surface, and a channel recessed into the engaging surface around a perimeter of the barrel and having a bottom parallel to the engaging surface, wherein the barrel is disposed in the hole, the recessed area is disposed in the channel, and the barrel includes a compressed annular locking ring.

19. The assembly of claim 18 wherein the channel further includes an outboard wall extending from the bottom at an angle perpendicular to the bottom.

* * * * *